Patented Nov. 7, 1939

2,178,569

UNITED STATES PATENT OFFICE 2,178,569

FOOD PRODUCT

Llewellyn R. Ferguson, Le Roy, N. Y., assignor, by mesne assignments, to General Foods Corporation, New York, N. Y., a corporation of Delaware No Drawing. Application August 22, 1934, Serial No. 741,016. Renewed February 9, 1938

22 Claims. (Cl. 99—130)

This invention relates to gelatin food products marketed in the form of gelatin powder which contains no or substantially no sugar.

Gelatin powder has been marketed as such without admixture with other ingredients which are supplied by the housewife in making the dessert. Sometimes an acid such as tartaric acid is sold along with the gelatin since it is inconvenient for the housewife to purchase the same separately. The ordinary gelatin dessert powder includes gelatin, acid to provide tartness, flavor, color and sugar, the sugar constituting the greater part of the bulk and weight of the product. Usually the flavor, and sometimes also the color, are liquids which in manufacturing the product are atomized, sprayed or otherwise distributed over the dry materials and adsorbed thereon. The large bulk of the dry ingredients makes it practicable to adsorb any desired quantity of flavor and so to obtain a final product which has the desired characteristic taste and flavor. The sugar in the product provides the desired bulk for this purpose, and also acts as a dispersing agent for the gelatin and aids in getting the gelatin into solution by counteracting its tendency to lump.

It is desirable for some purposes to produce a gelatin dessert powder without sugar. For example, since the taste of the individual consumer may vary it is desirable to provide an unsweetened product, leaving the addition of sugar to the consumer so that the dessert can be sweetened according to taste. Where the dessert is desired for diabetics for example and carbohydrates are to be avoided, a non-carbohydrate sweetening agent may be substituted for sugar such as the well-known sweet coal-tar derivatives, saccharine, dulcin or glucin.

The mere omission of sugar from the ordinary gelatin dessert powder, or the substitution of saccharine or the like for the sugar, does not provide a completely satisfactory product. While these changes do not affect the tart acid taste component that is conventionally provided by means of a fruit acid, they do involve a great reduction in the bulk of the product and thereby introduce difficulties in manufacture which have heretofore prevented the production of such a product in which the characteristic flavor is developed as highly as is desirable. In the ordinary gelatin dessert powder, the sugar constitutes upwards of 75% by weight of the product and hence the amount of flavor which can be incorporated by adsorption is greatly reduced and limited by the omission of the sugar. Furthermore, the sugar aids in dispersing the gelatin and counteracts a tendency to lump or cake which is particularly marked in the case of strong gelatin, so that when sugar is omitted it has sometimes been necessary to use boiling water in order that the gelatin may go quickly and readily into solution.

The above is true not only in the case of an unsweetened product but also when sweeteners such as saccharine are substituted for sugar, because such non-carbohydrate sweeteners are used in very small amounts and their substitution for sugar involves the same reduction in bulk as in the case of the unsweetened product. Hence the following description will be understood to apply equally to unsweetened gelatin dessert powders and to gelatin dessert powders containing saccharine or the like in substitution for sugar, both of which types may be described as sugarless.

It is an object of the invention to provide a novel sugarless gelatin dessert powder wherein the desired flavor can be incorporated in an amount sufficient to develop the characteristic taste and flavor of the prepared dessert as highly as is desirable from the standpoints of palatability and appeal to the consumer.

Another object is to provide a novel sugarless gelatin dessert powder which goes readily and quickly into solution in warm water.

A further object is to provide a novel gelatin dessert powder of the sugarless type characterized above wherein the tart taste component of the product is provided at least partially by an ingredient which provides greater bulk than the acid conventionally employed and improves the flavor of the product.

The ordinary gelatin dessert contains, in addition to gelatin, sugar and flavor, an acid ingredient which provides a tart taste component, this ingredient conventionally comprising a small quantity of a suitable fruit acid such as tartaric acid, citric acid or malic acid. This tart taste is highly desirable from the standpoint of palatability, but the amount of fruit acid must be kept small in order to prevent excessive sourness, so that the presence of the acid makes little difference in the bulk of the dessert powder. In a product embodying the present invention, all or part of the fruit acid is replaced by an acid ingredient having a tart taste component but less tart than the fruit acid itself so that it requires a larger quantity of said ingredient to obtain the desired tartness in the final product and the bulk of the product is increased. This ingredient must be selected not only with respect to the replacement of the fruit acid from the standpoint of tartness but also from the standpoint of taste or flavor which the ingredient itself might impart to the product as distinguished from tartness. In other words, the ingredient employed, aside from tartness, must not impart any distinctive undesirable flavor to the dessert. On the other hand, the ingredient should preferably be slightly salty, in order to bring out and improve the desired flavor in the dessert.

In accordance with the present invention this ingredient preferably comprises an acid salt which is less acid than the fruit acids conventionally used and hence may be used in greater quantities without causing excessive sourness, and which preferably imparts a slight saltiness to the product in order to bring out and improve its flavor. Suitable acid salts are characterized by a relatively low taste level as regards distinctive individual flavor and in the quantities employed do not impart distinctive flavors to the dessert. Furthermore, the ratio of sourness to saltiness should be high enough that the product is not rendered too salty, a slight salty taste being, however, an advantage in that it improves the flavor of the dessert. In general, any of the acid salts of the so-called fruit or vegetable acids or of other edible polybasic organic acids, where the base is sodium, potassium or ammonium, fulfill the foregoing requirements and can be substituted at least in part for the conventional fruit acids. Among the suitable salts, monosodium-citrate and mono-sodium-tartrate may be mentioned particularly. These salts are particularly well suited because of their high ratio of sourness to saltiness and of their relatively low taste level from the standpoint of individual and distinctive flavor.

One of these salts, or a mixture of two or more of them, can be substituted for the fruit acid to any desired extent provided that the substitution is not so great as to affect deleteriously the taste of the final product. The amount which can be employed in substitution for the fruit acid is therefore limited only by the requirement that it must not adversely affect the palatability of the product, as by making it too salty or by imparting an objectionable flavor. The flavor characteristics of mono-sodium acid citrate and mono-sodium acid tartrate are such that they can be substituted 100% for the fruit acid usually employed while providing a product possessing the desired characteristics set forth above to a high degree. Other acid salts, for example sodium bimalate and di-ammonium acid citrate, may be somewhat too salty or may have characteristic or distinctive flavors if substituted 100% for fruit acid but can be used to a less extent.

The bulk of the acid salt or mixture of salts which is substituted for the fruit acid is considerably greater than the bulk of fruit acid replaced so that the bulk of the product is increased materially. This increase in the bulk of the dry materials renders it possible to incorporate greater quantities of flavor because of the greater amount of dry ingredients on which the flavoring material can be adsorbed. Further, the slight saltiness imparted to the product by the acid salt brings out and improves the flavor. The resulting product therefore develops the desired characteristic flavor to a substantially greater degree than if fruit acid alone had been employed. The greater bulk due to the presence of the acid salt also assists in dispersing the gelatin so that it goes readily into solution in warm water and the use of boiling water is unnecessary even with strong gelatin.

The amount of gelatin to be employed will vary considerably depending upon its jellifying strength, since commercial food gelatins vary widely in this respect. The tartness of the product may also vary according to taste, so that the amount of acid ingredient to be employed may vary correspondingly. The flavor will usually comprise a highly concentrated solution of the flavoring principles of various fruits, or synthetic flavors such as those commonly known on the market may be used. Dry flavors are known in the form of flavoring material adsorbed on a suitable base such as cerelose and these may also be employed if desired. The quantity of sugar added in such cases will be quite small and constitutes merely a vehicle for the flavor and not a sweetening agent, so that such products are also substantially "sugarless" and this term is used in the appended claims in this sense. The amount of flavor to be employed depends also upon considerations of taste and palatability, but in a product of the type described, the amount of flavor used will generally be limited by the adsorbing capacity of the dry materials. Where color is necessary any suitable coloring material may be employed, either natural or synthetic.

The following is a typical example of proportions which have been found suitable in a product of this type.

| | |
|---|---|
| Gelatin | 8.60 gms. |
| Mono-sodium acid citrate | 7.00 gms. |
| Flavor | Indefinite |
| Color | Indefinite |
| | 15.60 gms. |

As indicated above, fruit acids such as citric, tartaric or malic acid may be used in combination with lesser amounts of various acid salts. Generally speaking, the range of the three ingredients gelatin, fruit acid and acid salt has the following limits:

| | |
|---|---|
| Gelatin | 7.0 to 12.0 gms. or 43.7% to 77.4% |
| Fruit acid | 0.0 to 1.5 gms. or 0.0% to 12.5% |
| Acid salt | 7.5 to 3.5 gms. or 51.7% to 20.6% |

It is not necessary that the acid salt be a salt of the particular fruit acid which is employed as tartrates may be used with citric acid, etc. In case a sweetened dessert for diabetics is desired, an amount of saccharine or the like in the neighborhood of 0.16 gm. may be added. It will be understood that the amounts given are for a small unit package to be combined with one pint of hot water and that the size of the package can be increased to any desired extent, the proportions of the several ingredients being maintained the same. It will also be understood that the relative proportions of the ingredients may vary from the above example within the limits discussed above.

This product will be found to be quickly soluble and non-lumping. It possesses the desired tartness to taste which results from acidity, and has a fully developed characteristic flavor depending upon the type of product that is intended.

What is claimed is:

1. A gelatin food product comprising a flavored sugarless mixture containing gelatin, fruit acid, and an acid salt of the group consisting of sodium, potassium and ammonium salts of fruit acids the gelatin, acid and salt being within the approximate proportions of 7.0 to 12.0 grams gelatin, 0.0 to 1.5 grams acid, and 7.5 to 3.5 grams salt.

2. A gelatin food product comprising a flavored sugarless mixture containing gelatin, fruit acid, an acid salt of the group consisting of sodium, potassium and ammonium salts of fruit acids, and a non-carbohydrate sweetener, the gelatin, acid and salt being within the approximate proportions of 7.0 to 12.0 grams gelatin, 0.0 to 1.5 grams acid, and 7.5 to 3.5 grams salt.

3. A gelatin food product comprising a flavored sugarless mixture containing gelatin, and acid ingredient including an acid salt of the group consisting of sodium, potassium and ammonium salts of fruit acids.

4. A gelatin food product comprising a flavored sugarless mixture containing gelatin and acid ingredient including fruit acid and an acid salt of the group consisting of sodium, potassium and ammonium salts of fruit acids.

5. A gelatin food product comprising a flavored sugarless mixture containng gelatin, a non-carbohydrate sweetener, and acid ingredient including fruit acid and an acid salt of the group consisting of sodium, potassium and ammonium salts of fruit acids.

6. A gelatin food product comprising a flavored sugarless mixture containing gelatin and an acid salt of the group consisting of sodium, potassium and ammonium salts of fruit acids, said acid salt having a high ratio of sourness to saltiness and a low taste level with respect to distinctive individual flavor and being such as to constitute the sole acid ingredient without deleteriously affecting the taste and flavor of the product.

7. A gelatin food product comprising a flavored sugarless mixture containing gelatin, a non-carbohydrate sweetening agent, and an acid salt of the group consisting of sodium, potassium and ammonium salts of fruit acids, said acid salt having a high ratio of sourness to saltiness and a low taste level with respect to distinctive individual flavor and being such as to constitute the sole acid ingredient without deleteriously affecting the taste and flavor of the product.

8. A gelatin food product comprising a sugarless powder containing gelatin, flavor, and mono-sodium-citrate.

9. A gelatin food product comprising a sugarless powder containng gelatin and mono-sodium citrate.

10. A gelatin food product comprising a sugarless powder containing gelatin, flavor and mono-sodium-tartrate.

11. An acidified gelatin dessert powder consisting of gelatin and mono-sodium citrate.

12. A gelatin food comprising a sugarless dry granular product containnig flavor, gelatin, a fruit acid, and an acid salt of the group consisting of sodium, potassium and ammonium salts of fruit acids, the acid salt constituting between 20% and 50% by weight of the product.

13. A gelatin food product comprising a sugarless powder containing gelatin, fruit acid, and acid salt of the group consisting of sodium, potassium and ammonium salts of fruit acids, and flavor, the gelatin, acid and salt being within the approximate proportions of 7.0 to 12.0 grams gelatin, 0.0 to 1.5 grams acid, and 7.5 to 3.5 grams salt, the flavor being adsorbed on the gelatin and acid ingredients.

14. A gelatin food product comprising a sugerless powder containing gelatin, acid ingredient including an acid salt of the group consisting of sodium, potassium and ammonium salts of fruit acids, and flavor adsorbed on the gelatin and acid ingredient.

15. A gelatin food product comprising a flavored sugarless mixture containing gelatin and acid including an acid salt of an edible polybasic organic acid with an edible inorganic base, said acid salt being characterized by a high ratio of sourness to saltiness and a low taste level.

16. A gelatin food product comprising a flavored sugarless mixture containing gelatin, a non-carbohydrate sweetening agent, and acid including an acid salt of an edible polybasic organic acid with an edible inorganic base, said acid salt being characterized by a high ratio of sourness to saltiness and a low taste level.

17. A gelatin food product comprising a flavored sugarless mixture containing gelatin and acid comprising a fruit acid and an acid salt of an edible polybasic organic acid with an edible inorganic base, said acid salt being characterized by a high ratio of sourness to saltiness and a low taste level.

18. A gelatin food product comprising a flavored sugarless mixture containing gelatin, a non-carbohydrate sweetening agent, and acid comprising a fruit acid and an acid salt of an edible polybasic organic acid with an edible inorganic base, said acid salt being characterized by a high ratio of sourness to saltiness and a low taste level.

19. A gelatin food product comprising a flavored sugarless mixture containing gelatin and acid including an acid salt of an edible polybasic organic acid with an inorganic base of the group consisting of sodium, potassium and ammonium, said acid salt having a high ratio of sourness to saltiness and a low taste level.

20. A gelatin food product comprising a flavored sugarless mixture containing gelatin, a non-carbohydrate sweetening agent and acid including an acid salt of an edible polybasic organic acid with an inorganic base of the group consisting of sodium, potassium and ammonium, said acid salt having a high ratio of sourness to saltiness and a low taste level.

21. A gelatin food product comprising a flavored sugarless mixture containng gelatin, a non-carbohydrate sweetening agent and acid including a fruit acid and an acid salt of an edible polybasic organic acid with an inorganic base of the group consisting of sodium, potassium and ammonium, said acid salt having a high ratio of sourness to saltiness and a low taste level.

22. A gelatin food product comprising a flavored sugarless mixture containing gelatin and acid including a fruit acid and an acid salt of an edible polybasic organic acid with an inorganic base of the group consisting of sodium, potassium and ammonium, said acid salt having a high ratio of sourness to saltiness and a low taste level.

LLEWELLYN R. FERGUSON.